No. 875,462. PATENTED DEC. 31, 1907.
T. D. ROWAN.
COMBINED SPIRIT LEVEL AND GAGE.
APPLICATION FILED APR. 24, 1906. RENEWED MAY 25, 1907.
4 SHEETS—SHEET 1.
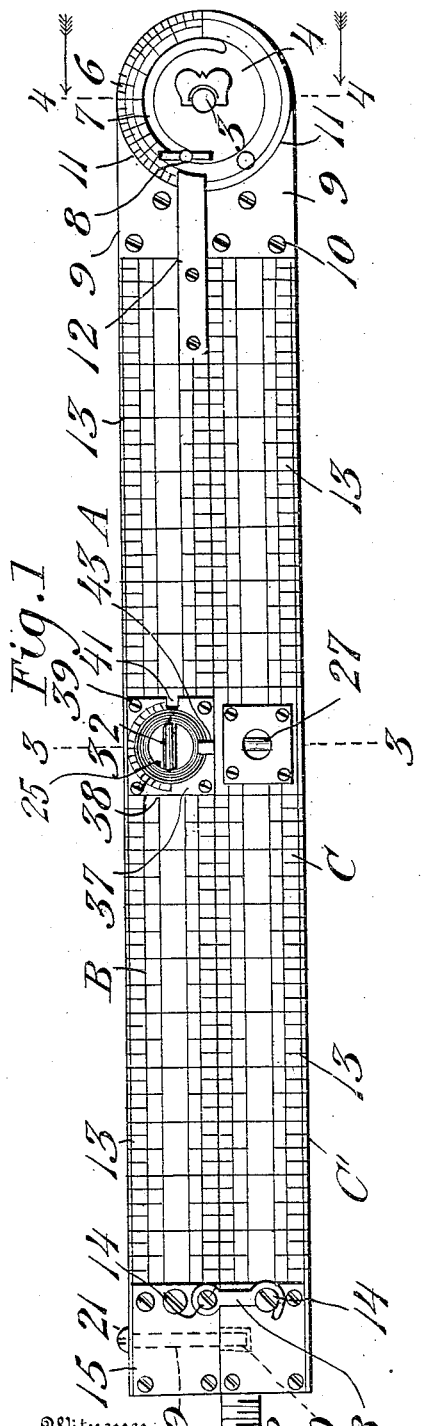
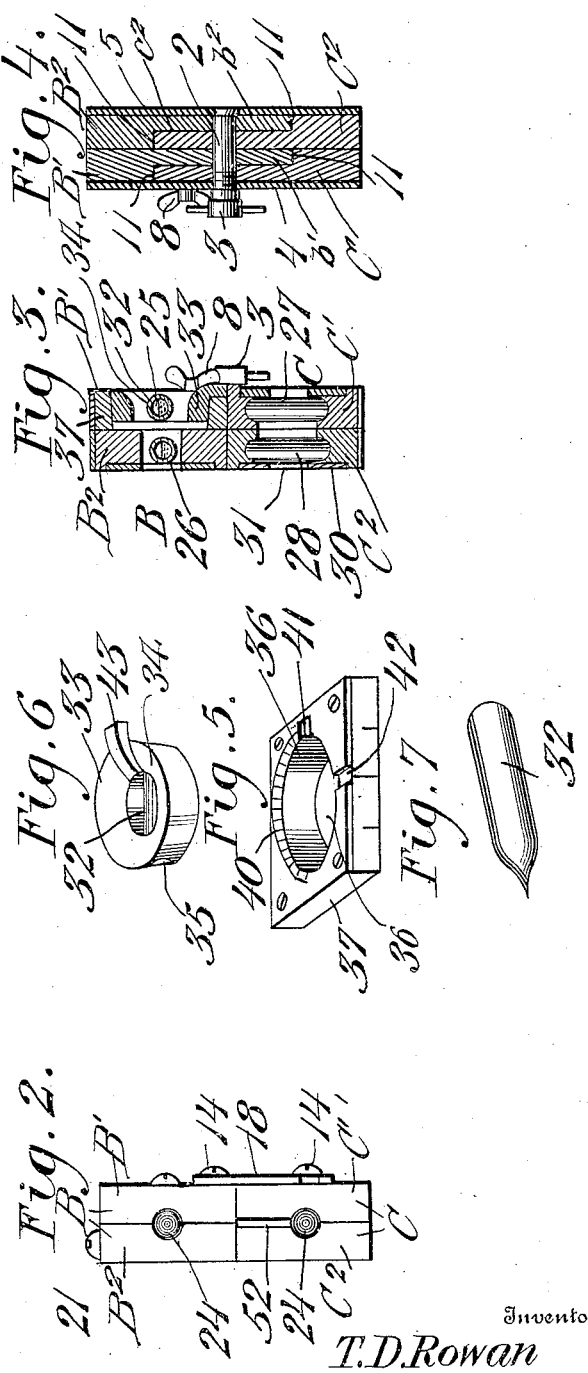
Witnesses
Phil O. Barnes
C. C. Hines
Inventor
T. D. Rowan
By Victor J. Evans.
Attorney

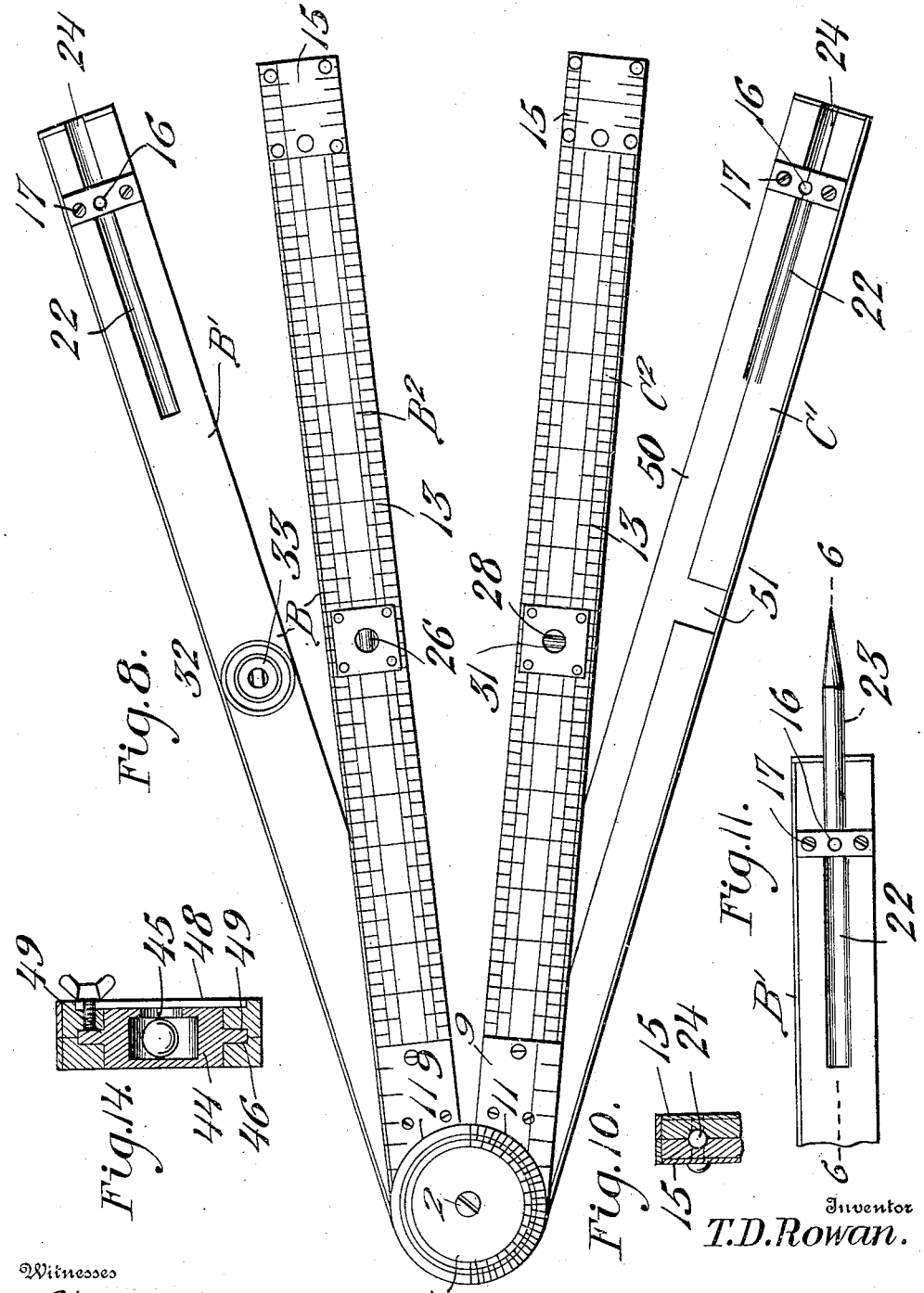

No. 875,462. PATENTED DEC. 31, 1907.
T. D. ROWAN.
COMBINED SPIRIT LEVEL AND GAGE.
APPLICATION FILED APR. 24, 1906. RENEWED MAY 25, 1907.
4 SHEETS—SHEET 3.
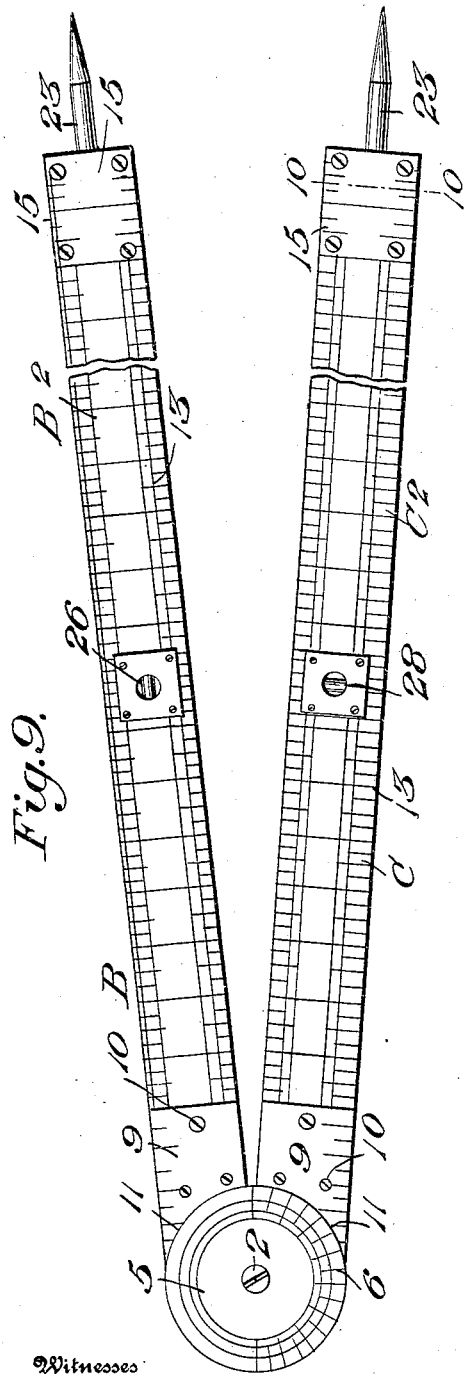
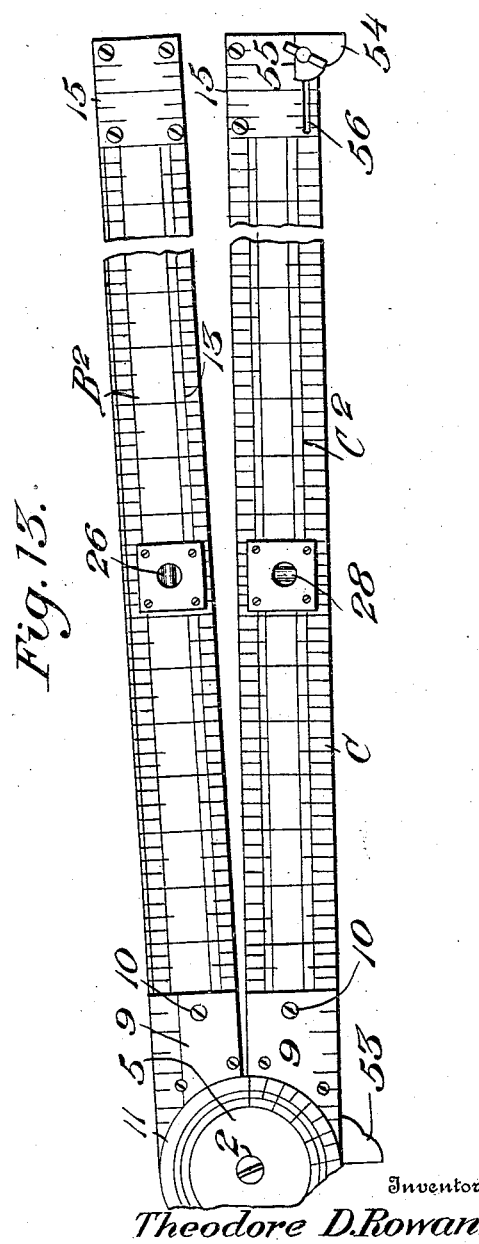
Inventor
Theodore D. Rowan.
Witnesses
Phil. E. Barnes
C. C. Hines
By
Victor J. Evans
Attorney No. 875,462. PATENTED DEC. 31, 1907.
T. D. ROWAN.
COMBINED SPIRIT LEVEL AND GAGE.
APPLICATION FILED APR. 24, 1906. RENEWED MAY 25, 1907.
4 SHEETS—SHEET 4.
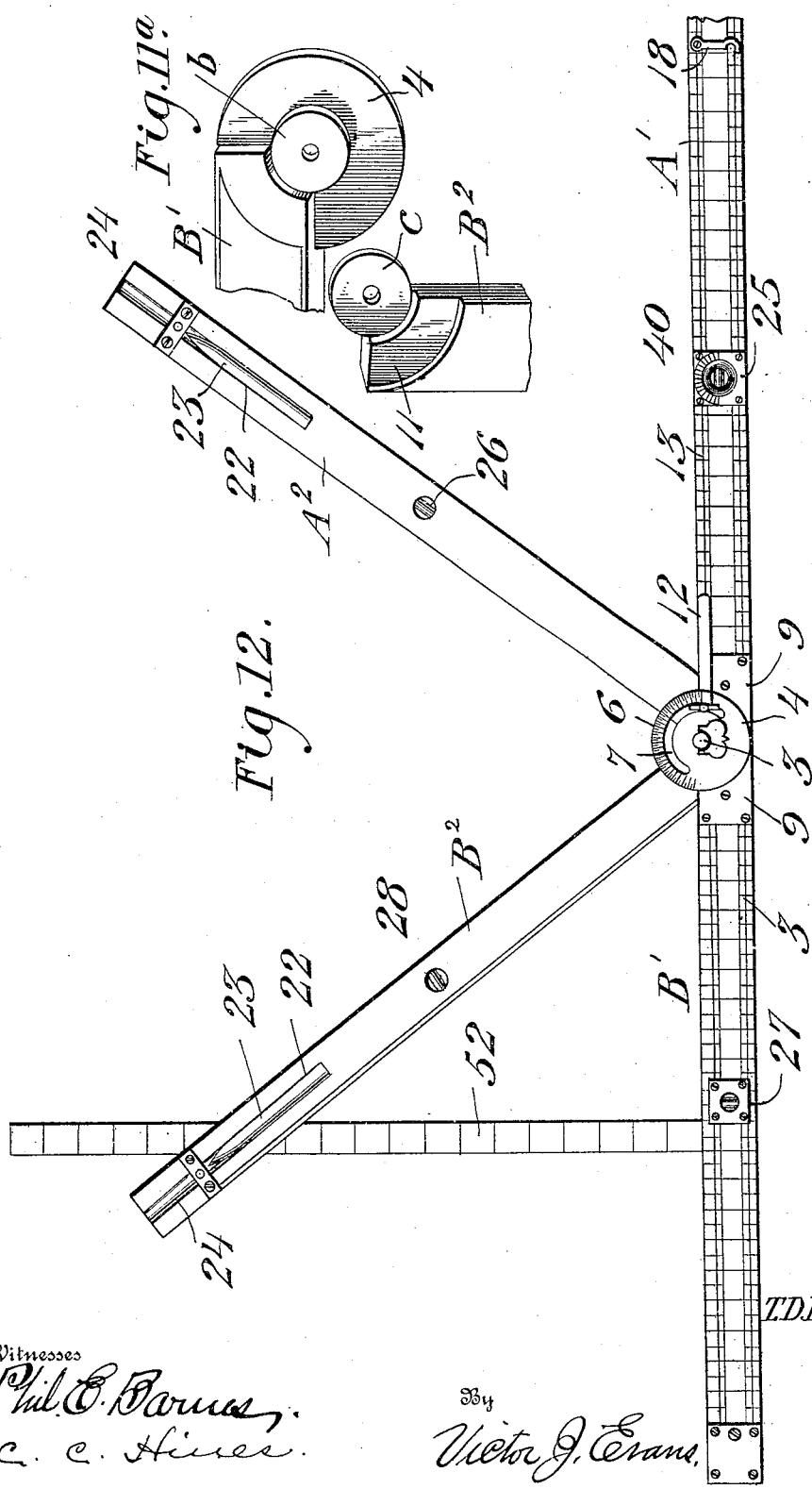
Witnesses
Phil. E. Barnes
C. C. Hines
Inventor
T. D. Rowan
By
Victor J. Evans,
Attorney

UNITED STATES PATENT OFFICE.

THEODORE D. ROWAN, OF COLUMBIA, SOUTH CAROLINA, ASSIGNOR OF ONE-HALF TO LEONIDAS B. DOZIER, OF COLUMBIA, SOUTH CAROLINA.

COMBINED SPIRIT LEVEL AND GAGE.

No. 875,462.         Specification of Letters Patent.         Patented Dec. 31, 1907.

Application filed April 24, 1906, Serial No. 313,416. Renewed May 25, 1907. Serial No. 375,695.

*To all whom it may concern:*

Be it known that I, THEODORE D. ROWAN, a citizen of the United States of America, residing at Columbia, in the county of Richland and State of South Carolina, have invented new and useful Improvements in Combined Spirit Levels and Gages, of which the following is a specification.

This invention relates to a combined spirit level and gage, and has for its object to provide a simple, comparatively inexpensive and convenient construction of device of this character which may be employed to perform the functions of a level, square and angular gage for truing a wall or building and for determining the angles of the beams, joists, etc., employed in the construction thereof and for determining the angles on which the ends of beams and joists are to be cut, and further to provide a device of this character by which the falling degree of a floor or surface may be readily and accurately determined and the spirit tubes adjusted accordingly.

A further object of the invention is to provide a gage and level adapted for general use by architects, engineers and mechanics of various classes for leveling, degree work, etc., and many other purposes, and which is also susceptible of use as a track gage and for laying off and leveling and degreeing railway curves and determining the proper relative positions of the rails.

With the above and other objects in view, the invention consists of the novel construction, combination and arrangement of parts hereinafter fully described and claimed, reference being had to the accompanying drawings, in which:—

Figure 1 is a front side elevation or face view of a combination implement embodying my invention. Fig. 2 is an end elevation thereof. Figs. 3 and 4 are transverse sections taken, respectively, on the lines 3—3 and 4—4 of Fig. 1. Figs. 5, 6 and 7 are detail perspective views of the parts of the adjustable spirit level. Fig. 8 is a rear side elevation showing the arms of the device spread apart to indicate their relative arrangement and more clearly disclose the construction thereof. Fig. 9 is a view similar to Fig. 8, showing the companion primary and secondary arms of each staff united and the device adapted for use as a compass or divider. Fig. 10 is a fragmentary detail transverse section taken on line 10—10 of Fig. 9. Fig. 11 is an inner face view of the outer end portion of one of the secondary arms showing the recesses therein for the reception of the tram or scribing point. Fig. 11$^a$ is a perspective view of the hinge ends of the arms of the staffs. Fig. 12 is an elevational view showing certain adjustments of the parts of the device. Fig. 13 is a view of the device as adapted for use as a track gage and level. Fig. 14 is a sectional view similar to Fig. 3, showing a modification in the construction of the adjustable spirit level.

Referring now more particularly to the drawings, A designates the device as a whole, which comprises a pair of staffs or members B and C, each composed of primary and secondary arms, B' and B$^2$ representing the arm of staff B, and C' and C$^2$ the arms of staff C. The arms of both staffs are pivotally connected at one end upon a common axis or pivot member, and to this end are provided Fig. 4 with circular heads $b'$, $b^2$ and $c'$, $c^2$, respectively, centrally apertured for the passage of a pivot screw 2 carrying a winged nut 3 by which the arms when adjusted to the desired position may be clamped in adjusted relation. The heads of the secondary arm C' of staff C and primary arms B$^2$ of staff B are disposed, respectively, at the front and rear of the heads of the other arms and are integrally formed with or have suitably attached thereto circular scale plates 4 and 5 provided with degree graduations 6 arranged in the arc of a circle, and preferably having a range of 180 degrees, whereby the angular relation of the arms when spread out to the different adjustments to which they are susceptible may be determined. The scale plate 4 is also provided with an arc-shaped or semi-circular slot 7 arranged, with the scale 6, in concentric relation to the axle or pivot screw 2, and through this slot projects a gage screw 8 which enters an aperture in the end of the primary arm B' and has its head arranged to be brought in bearing contact with the outer face of the plate 4 so that it may be adjusted to vary its frictional engagement therewith, and thereby adapt the staffs to be adjusted with greater or less freedom and to be clamped in adjusted position without the necessity of tightening the nut 3. Preferably the headed ends of the arms are inserted in suitable metallic sockets 9 to which they are secured by screws or other fastenings 10, and the respective heads are formed upon said sockets, which latter are suitably recessed, as indicated at 11, to receive the scale plates 4 and 5 to adapt the latter to lie flush with the front and rear surfaces of the implement. The primary arm B' of the staff B may carry a metallic strip 12 secured at one end thereto and overlapping the free edge of the plate 4 to guide the latter in its movements and to hold the same seated in its recess, and the said free end of this strip may be employed as a pointer or indicator to coöperate with the scale 6 to indicate the angular relation of the staffs.

The outer or front faces of the primary arms B' and C' and the outer or rear faces of the secondary arms B² and C² are graduated, as at 13, to designate feet and inches, as clearly shown, respectively, in Figs. 1, 8 and 9. The free ends of the arms of each staff are adapted to be united for movement in unison by a screw 14 (Fig. 1) passing through an aperture in a plate 15 carried by the primary arm and entering a threaded socket 16 (Fig. 8) formed in a transverse metallic strip or plate 17 embedded in the inner or front face of the companion secondary arm. To the primary section of one of the staffs is pivotally connected a catch hook 18 adapted to engage the fastening screw 14 on the primary section of the other staff, whereby the free ends of the staffs, with their arms coupled together, may be secured in fixed relation to hold the device in folded condition for convenient storage or transportation, or when the device is designed to be used as a level, as clearly indicated in Fig. 1. One of the arms of each staff, such as the primary arm B² of the staff B, may further be provided with a vertical passage 19 (Fig. 1) and the upper edge of the primary arm C' of the staff C formed with a threaded socket 20 (see Fig. 1) to receive a screw 21, whereby the staffs may be more securely fastened in assembled relation when the implement is packed for shipment or is to be transported any considerable distance.

The meeting faces of the arms of each staff are provided with recesses 22 coöperating to form keepers or receiving chambers for tram or scribing points 23 which may be retained therein when not in use. Opening through the extremities of the arms and formed in the meeting faces thereof are also recesses 24 coöperating to form sockets for the reception of the points, so that the latter may be clamped for use between the companion primary and secondary arms with their points projecting beyond the free ends of the staffs to adapt the device to be used as compasses or dividers, for measuring off, scribing circles and other analogous work. The scribing points when arranged within their keeper recesses 22 abut against the plate 17 and are held thereby from longitudinal shifting movement.

The primary and secondary arms of the staff B are provided at their longitudinal centers with horizontal spirit levels 25 and 26, while the primary and secondary arms of the staff C are provided with similarly arranged plumb levels 27 and 28. The levels 26, 27 and 28 are preferably applied in a similar manner to their respective arms, the spirit tubes thereof being disposed in suitable receiving sockets in the arms and covered by countersunk plates 30 (Fig. 3) suitably fastened upon the faces of the arms and provided with sight openings 31 through which the air bubbles in the tubes may be viewed. The tubes of the levels 25 and 26, of course, extend horizontally or longitudinally of their arms, while the tubes 27 and 28 extend vertically, to adapt them to serve their respective functions.

The spirit level 25 carried by the primary arm B' of the staff B is of novel construction, and as shown the spirit tube 32 thereof, see Fig. 6, extends across the opening in an annular holder or supporting ring 33, formed at one side with a socket 34 to receive one end of the tube and at the diametrically opposite side with a passage 35 to permit the tube to be inserted and withdrawn by an endwise sliding movement so as to provide for the ready and convenient substitution of a new tube in the event of the one in use being broken. The supporting ring 33 is adapted to fit within an opening 36 in a carrier block 37 inserted in a recess 38 in the arm B' and fastened to said arm by screws or other fastenings 39, so as to lie with its upper face flush therewith. The face of the block 37 is provided with degree graduations 40 concentric with the opening therein, and is formed with notches 41 and 42 adapted to receive a lug or finger 43 carried by the ring 33. The ring 33 frictionally engages the wall of the opening 36 and is thereby held from outward movement, and it is retained from rotary movement by the engagement of the lug 43 with the notch 41 or notch 42, which notches are arranged, respectively, at the far end of the scale 40 and at a point diametrically opposite the center of said scale, or, respectively, at the 180 and 270 degree points of a circle of which the scale forms a complete half. By this construction it is apparent that the tube 32 has a rotary adjustment in an arc of 90 degrees to position it horizontally or vertically, as circumstances may require in the use of the instrument to adapt it for leveling or plumb work.

In the construction shown in Fig. 14 I have disclosed a modification in the form of the spirit level 25 in which the tube is arranged within a chambered rotary carrier 44 having a sight aperture 45 and a circumferential flange 46, the latter being mounted for rotary movement in an annular guideway 47 formed in the arm, which is here suitably constructed for its reception, and in the face of the arm is countersunk a plate 48 having a threaded aperture for the reception of a binding screw 49 adapted to engage the said flange 46, whereby the carrier 44 may be clamped at any point to hold the tube at any position in its circular path of adjustment.

The primary arm C' of the staff C is provided on its inner face and opening through its normally upper edge with a longitudinal groove or recess 50 (Fig. 8) intersected at a point adjacent the center of the arm by a vertical socket or recess 51 suitably closed at its lower edge. A blade 52, (see Fig. 12,) which serves the function of a plumb or degree blade, is adapted to normally fit within the recess 50 and to lie between the arms C', C², thus holding it confined when out of use. This blade is adapted when the primary arms of the instrument are disposed in longitudinal alinement to be arranged vertically, as shown in Fig. 12, and to be fitted at one end within the socket or recess 51, so that it will extend perpendicularly and may be used in conjunction with the arms C' and C² for determining the falling degree of a floor or surface.

In operation, the device may be used in an obvious manner to perform the ordinary functions of a spirit level or plumb, and when one of the staffs is disposed at right angles to the other, the device may be used as a square, and when the staffs are disposed in longitudinal alinement, may be used as a gage rule. The staffs may also be adjusted to any desired relative angle within a range of 90 degrees for making various angular measurements, the angle of inclination of one relative to the other being readily determined by means of the degree gage 6. By disconnecting the secondary arms from the primary arms of the staffs, the arms may be adjusted to determine the pitches or angles of different parts, and by connecting the arms and disposing the points 23 as shown in Fig. 9, the device may be employed as a pair of compasses or dividers. If, in the use of the device, it becomes desirable to ascertain any degree upon the margin of a square or circle, the blade 52 is disposed as shown in Fig. 12 and the secondary arm C² turned upon its pivot until its edge intersects the appropriate degree graduation on the scale 6, whereupon the active edge of said arm will aline with the corresponding line of the blade and a line drawn parallel with and in continuation of the degree line of the gage 6 to intersect the margin of the circle or square will give the desired degree upon the latter. The parts of the device may also be adjusted to ascertain the pitch of a roof and the corresponding angle of the rafters, or to ascertain the angle of a roof relative to the walls of a building, and to determine the proper angles of the beams, joists, etc., employed in the construction of the building, or to determine the angles on which the ends of the beams and joists are to be cut. By means of the blade 52 the exact falling degree of a floor or surface may be readily and accurately determined and the spirit levels adjusted accordingly. Many other uses of the device will be apparent to those versed in the art.

In Fig. 13 I have shown one of the arms of the device provided with fixed and adjustable gage pieces 53 and 54, disposed a short distance forwardly from the ends thereof, the gage piece 54 being adjustable longitudinally of the arm by a clamping screw or device 55 movable in a longitudinal slot 56 formed in said arm. This construction adapts the device to be used as a track gage for properly spacing the opposite rails of a track. In such use, it will, of course, be understood that the ends of the beam or the arm to which the gages are applied are rested upon the heads of the rails, and the gages will project downward and indicate the space which should exist between the inner faces of the heads of the opposite rails, the adjustability of the gage 54 permitting such variations as may be found necessary under different conditions of service in the equipment of a track and in determining the proper spacing of the rails in narrow and broad gage constructions. The construction of the instrument also enables the proper relative elevations of the rails to be determined and whether or not the rails of a track have been properly laid, and also adapts the device to be used for laying off and leveling and degreeing railway curves and determining the relative positions of the inner and outer rails thereof in degrees. By adjustably mounting the spirit level 25 the tube thereof may be adjusted to set at different angles to facilitate operations in degree work.

Having thus described the invention, what is claimed as new, is:—

1. A device of character described comprising a pair of staffs, each staff embodying a pair of graduated arms or blades, one carrying a horizontal and the other a plumb level, the blades of the two staffs being coaxially pivoted at one end, means upon each staff for interlocking the arms thereof, and interengaging means upon the staffs for locking the two staffs together.

2. A device of the character described comprising a pair of staffs, each embodying a pair of graduated arms, the arms of the staffs being coaxially pivoted at one end and having an angle degree scale concentric with their pivotal connection, the arms of one staff being provided with horizontal levels and the arms of the other staff with plumb levels, substantially as described.

3. A device of the character described comprising a pair of staffs, each composed of a pair of graduated arms arranged to fold one behind the other, the arms of the two staffs being coaxially pivoted at one end, interlocking means for connecting the free ends of the arms of each staff, and interlocking means for securing the free ends of the two staffs together.

4. A device of the character described comprising a pair of staffs pivotally connected at one end, and having an angle degree scale concentric with their pivotal connection, each staff comprising a pair of graduated arms coaxially pivoted on said pivotal connection, the arms of one staff being provided with horizontal levels and the arms of the other staff with plumb levels, interlocking means for connecting the free ends of the arms of each staff, and interlocking means for connecting the staffs together to hold them in rigid relation.

5. A device of the character described comprising a pair of staffs pivotally connected at one end, and having an angle degree scale concentric with their pivotal connections, one of the arms of each staff being provided with a level tube and the other with a plumb tube, means for connecting the free ends of the arms of each staff, means for connecting the staffs together to hold them in rigid relation, and a degree blade adapted to be housed between the arms of one of the staffs and to be supported at right angles to coöperate with one of said arms for degree measurement.

6. A device of the character described comprising a pair of staffs pivotally connected at one end and having an angle degree gage concentric with the pivotal connection, each staff comprising a pair of arms formed upon their meeting faces with seats or recesses providing receiving and holding sockets, scribing points adapted to be disposed in said sockets, and means for connecting the arms of the respective staffs together.

7. A device of the character described comprising a pair of staffs, said staffs being pivotally connected at one end and having an angle degree gage concentric with the pivotal connection, each staff comprising a pair of arms adapted to fold in parallel relation and provided with means for connecting them, one of the arms of each staff having a degree scale and a spirit level, the arms of one of the staffs also being constructed to form a recess, and a holding socket disposed at an angle thereto and a degree blade adapted to be disposed in said recess and held in said socket to coöperate with one of the blades for determining degree measurements.

8. In a device of the character described, a pair of staffs pivotally connected at one end and having an angle degree gage concentric with the pivotal connection, each staff comprising a pair of arms arranged to fold in parallel relation, means for connecting the free ends of the arms of each staff, means for connecting the staffs together, and a level upon one of the staffs comprising a stationary member having a degree scale and a rotary member carrying a spirit tube, and means for retaining the rotary member in adjusted position.

9. A device of the character described comprising a pair of staffs pivotally connected at one end and having a gage concentric with their pivotal connection for determining their angular relation, each staff comprising a pair of arms, spirit levels carried by said arms, the arms of one of the staffs being longitudinally recessed to form a receiving space having a right angular intersecting socket, and a degree blade adapted to be housed in said space and free from connection with the staffs, said blade adapted to be inserted in said socket for operation in connection with one of said arms.

In testimony whereof, I affix my signature in presence of two witnesses.

THEODORE D. ROWAN.

Witnesses:
   E. N. JAYNES, Jr.,
   M. O. ROCHE.